US010813190B2

(12) United States Patent
Uchida

(10) Patent No.: US 10,813,190 B2
(45) Date of Patent: Oct. 20, 2020

(54) VEHICLE LIGHTING UNIT CONTROL DEVICE

(71) Applicant: DENSO CORPORATION, Kariya, Aichi (JP)

(72) Inventor: Yuki Uchida, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 0 days.

(21) Appl. No.: 16/329,381

(22) PCT Filed: Sep. 5, 2017

(86) PCT No.: PCT/JP2017/031952

§ 371 (c)(1),
(2) Date: Feb. 28, 2019

(87) PCT Pub. No.: WO2018/043754

PCT Pub. Date: Mar. 8, 2018

(65) Prior Publication Data

US 2019/0200430 A1 Jun. 27, 2019

(30) Foreign Application Priority Data

Sep. 5, 2016 (JP) ................................ 2016-172808

(51) Int. Cl.
*H05B 47/10* (2020.01)
*F21V 29/61* (2015.01)
(Continued)

(52) U.S. Cl.
CPC ............ *H05B 47/10* (2020.01); *F21S 41/141* (2018.01); *F21S 45/40* (2018.01); *F21V 29/61* (2015.01); *F21V 29/67* (2015.01)

(58) Field of Classification Search
CPC ........ H05B 37/02; H05B 47/10; H05B 47/14; H05B 47/135; H05B 45/10; H05B 45/14;
(Continued)

(56) References Cited

U.S. PATENT DOCUMENTS 7,015,470 B2 * 3/2006 Faytlin ...................... B60R 1/00 250/330
7,654,696 B2 * 2/2010 Pollmann-Retsch ........................ H05B 41/2928 315/118

(Continued)

FOREIGN PATENT DOCUMENTS

JP 59185168 A * 10/1984 ............. H02M 7/48
JP 2010-129258 A 6/2010

*Primary Examiner* — Amy Cohen Johnson
*Assistant Examiner* — Syed M Kaiser
(74) *Attorney, Agent, or Firm* — Maschoff Brennan

(57) ABSTRACT

A vehicle lighting unit control device according to an aspect of the present disclosure includes a lighting unit control section controlling a lighting unit, a power supply section outputting electrical power to a fan device, and a power supply control section. The fan device includes a fan and a motor. The power supply control section includes a rotation information acquisition section and an output interruption section. If the fan locks, the output interruption section interrupts electrical power supplied from the power supply section to the fan device, before the fan device performs protective operation for interrupting electrical power supplied to the motor.

7 Claims, 5 Drawing Sheets

(51) Int. Cl.
*F21S 41/141* (2018.01)
*F21V 29/67* (2015.01)
*F21S 45/40* (2018.01)

(58) Field of Classification Search
CPC ...... H05B 45/32; F21W 101/10; F21V 29/61; F21V 29/67; F21S 41/141; F21S 48/32
See application file for complete search history.

(56) References Cited

U.S. PATENT DOCUMENTS 8,070,324 B2* 12/2011 Kornitz .................. F21V 29/61 362/294
2004/0052510 A1* 3/2004 Hsu .......................... H02P 6/16 388/804
2005/0279949 A1* 12/2005 Oldham ................ G05D 23/20 250/458.1
2007/0273290 A1* 11/2007 Ashdown ............. F21V 29/717 315/113
2008/0048598 A1* 2/2008 Shibuya ................. H02P 6/185 318/400.1
2008/0315808 A1* 12/2008 Mishima .................. H02P 6/14 318/400.21
2009/0147618 A1* 6/2009 Kovacic ............... A47J 43/082 366/252
2009/0243525 A1* 10/2009 Ikeda .................. H02H 7/1222 318/400.22
2010/0270927 A1* 10/2010 Noyori .................... B60Q 1/28 315/77
2011/0195652 A1* 8/2011 Smith ............... H05K 7/20736 454/184
2012/0241235 A1* 9/2012 Shintani ............... E02F 3/7609 180/68.1
2012/0274937 A1* 11/2012 Hays ...................... G01S 17/58 356/337
2014/0241001 A1* 8/2014 Yoshikawa ............ F21S 45/10 362/547
2015/0178997 A1* 6/2015 Ohsaki ................ G07C 5/0808 701/29.1
2016/0352279 A1* 12/2016 Mishima ................ H02P 27/08
2017/0021466 A1* 1/2017 Hiroshima ............ B23Q 11/06
2017/0328293 A1* 11/2017 Yamanaka ........... H02M 3/156
2017/0331411 A1* 11/2017 Kitano ...................... H02P 6/06
2019/0061724 A1* 2/2019 Segawa ................ B60T 13/686
2019/0200430 A1* 6/2019 Uchida ................. H05B 37/02

* cited by examiner

VEHICLE LIGHTING UNIT CONTROL DEVICE

CROSS-REFERENCE TO RELATED APPLICATION

This application is the U.S. national phase of International Application No. PCT/JP2017/031952 filed Sep. 5, 2017 which designated the U.S. and claims priority to Japanese Patent Application No. 2016-172808 filed Sep. 5, 2016, the contents of which are incorporated herein by reference.

TECHNICAL FIELD

The present disclosure relates to a technique for supplying electrical power to a fan device used for cooling the vehicle lighting units.

BACKGROUND ART

Vehicles may be provided with a fan for cooling the lighting units. In recent years in particular, vehicle lighting units using LEDs as light sources are becoming widespread. Of the lighting units using LEDs, those which have a large heat generation rate are very often provided with a fan device having a fan configured to be rotated by a motor.

If a fan device for cooling lighting units is installed in a vehicle, the vehicle is provided with a power circuit that supplies electrical power to the fan device. By supplying electrical power to the fan device from the power circuit, the fan is rotated to thereby cool the lighting units.

Performance of fan devices is advancing. The following PTL 1 describes a fan device provided with a protective function. With this protective function, if the fan locks, driving current supplied to the fan device from the power circuit is interrupted for a given length of time by the fan device.

CITATION LIST

Patent Literature

[PTL 1] JP 2010-129258 A

SUMMARY OF THE INVENTION

However, as a result of thorough studies, the inventor has found the following issues. Specifically, if driving current to the fan device is interrupted by the protective function of the fan device in a state where electrical power is supplied thereto from the power circuit, the output voltage of the power circuit may instantaneously overshoot.

If the output voltage of the power circuit overshoots, however instantaneously it may be, an excessively high voltage due to the overshoot is inputted to the fan device, and the excessively high voltage may damage the fan device.

The overshoot may be minimized, for example, by providing a capacitor on an output side of the power circuit. However, use of this method may involve increase in the number of parts.

An aspect of the present disclosure lies in provision of a technique that can reduce or prevent overshoot of the output voltage that is supplied to a fan device having the protective function mentioned above if the fan locks, while minimizing the increase in the number of parts.

A vehicle lighting unit control device according to an aspect of the present disclosure is installed in a vehicle. The vehicle is provided with a lighting unit, and a fan device configured to cool the lighting unit. The fan device includes a fan, and a motor configured to rotate the fan. The fan device is configured such that the fan is rotated by the motor which is rotated by electrical power supplied from the vehicle lighting unit control device. The fan device is configured to perform protective operation to reduce or interrupt input of electrical power to the motor if the fan goes into a first locked state.

The vehicle lighting unit control device includes a lighting unit control section, a power supply section, and a power supply control section. The lighting unit control section is configured to control the lighting unit. The power supply section is configured to generate and output electrical power to the fan device. The power supply control section is configured to control output of electrical power supplied to the fan device from the power supply section.

More specifically, the power supply control section includes a rotation information acquisition section, and an output interruption section. The rotation information acquisition section is configured to acquire rotation information indicative of the rotational frequency of the fan. The output interruption section is configured to determine whether the fan is in a second locked state, based on the rotation information acquired by the rotation information acquisition section, and interrupt output of electrical power to the fan device from the power supply section if the fan is in the second locked state.

The second locked state is set to be the same as the first locked state, or set to occur earlier than the first locked state if the rotational frequency of the fan is decreasing. The output interruption section is configured to interrupt output of electrical power to the fan device before the fan device performs protective operation, if the second locked state has occurred.

With this configuration, the fan device is ensured to perform protective operation if the fan is in the first locked state, while the vehicle lighting unit control device determines whether the fan is in the second locked state, and, if affirmatively determined, interrupts output of electrical power. In the occurrence of the second locked state, the vehicle lighting unit control device interrupts output of electrical power before the fan device performs protective operation.

Therefore, the fan device is prevented from performing protective operation in a state where electrical power is being supplied thereto. If the fan locks, the occurrence of overshoot is reduced or prevented in the voltage supplied to the fan device from the power supply section.

The bracketed reference signs in the claims indicate correspondence with the specific means in the following embodiments each described as a mode, and should not limit the technical scope of the present disclosure.

DETAILED DESCRIPTION OF THE PREFERRED EMBODIMENTS

With reference to the drawings, some embodiments of the present disclosure will be described below.

1. First Embodiment

(1-1) Overall Configuration of Vehicle

Figure 1:
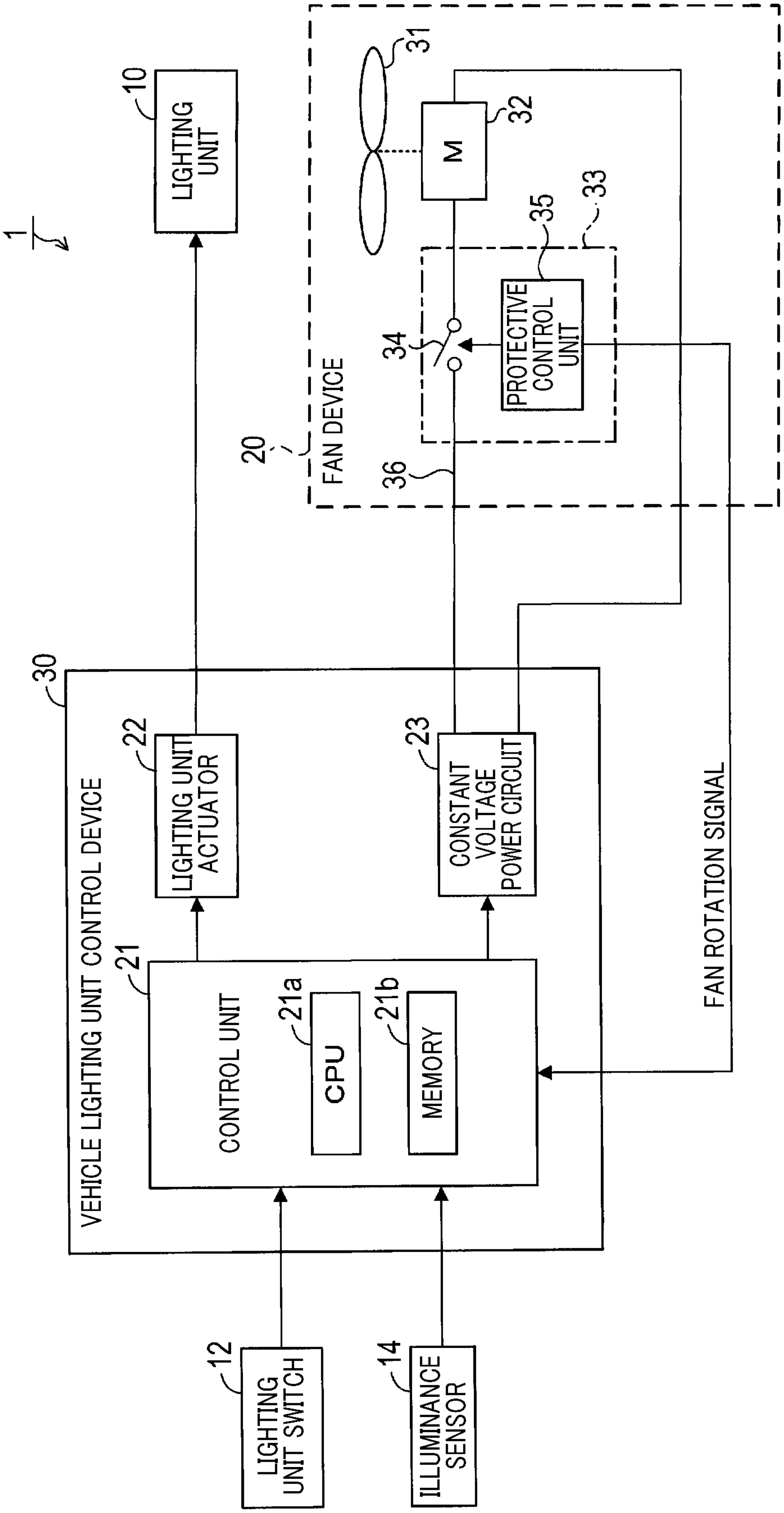
FIG. 1 is a schematic diagram illustrating a configuration of a vehicle, according to an embodiment.

As shown in FIG. 1, a vehicle 1 includes a lighting unit 10, a fan device 20, and a lighting unit control device 30.

The vehicle 1, for example, is a four-wheel vehicle. It should be noted that the vehicle 1 may be any type of vehicle as long as it is configured to run with the wheels being rotated.

The lighting unit 10 is a device for emitting light around or inside the vehicle 1. In general, vehicles have lighting units including, for example, a headlamp, a side lamp, a taillamp, an interior lamp, and the like. The lighting unit 10 of the present embodiment, as an example, is a headlamp.

In general, as types of lighting unit, there can be mentioned, for example, a halogen bulb, a discharge lamp, an LED lamp, and the like. The lighting unit 10 of the present embodiment, as an example, is an LED lamp. Specifically, the lighting unit 10 has a plurality of LEDs. The lighting unit 10 is configured such that all or part of the plurality of LEDs is lit when energized.

The fan device 20 blows air to the lighting unit 10 to cool the lighting unit 10. The fan device 20 includes a fan 31, a motor 32, and a protective circuit 33.

The fan 31 serves as a member for generating an airflow by being rotated. In the vehicle 1, the fan 31 is disposed so that the airflow generated with the rotation thereof is applied to the lighting unit 10. The motor 32 is a drive source for rotating the fan 31. The motor 32 has a rotary shaft connected to the fan 31 directly or via a transfer mechanism, such as a gear, so that the fan 31 is rotated with the rotation of the motor 32.

The motor 32 receives a supply of direct-current fan power from the lighting unit control device 30, for rotation of the motor 32, i.e. for rotation of the fan 31.

The protective circuit 33 includes a protective switch 34, and a protective control unit 35. The protective switch 34 is provided on a power supply path 36 that is a path for supplying fan power to the motor 32 from the lighting unit control device 30. If the protective switch 34 is turned on and the power supply path 36 is energized, the fan power is supplied to the motor 32 from the lighting unit control device 30 via the protective switch 34. While the protective switch 34 is off, the power supply path 36 is disconnected and no fan power is supplied to the motor 32.

While fan power is supplied from the lighting unit control device 30, the protective control unit 35 is activated by the fan power. The protective control unit 35 has a protective function. With the protective function, the fan device 20 is protected from overcurrent that would be caused when the fan 31 locks. Specifically, due to the protective function of the protective control unit 35, if the fan 31 locks, the protective switch 34 is turned off to disconnect the power supply path 36 for a predetermined period Ts1, and then after lapse of the period Ts1, the protective switch 34 is turned on again to energize the power supply path 36.

The protective switch 34 is usually in an on state. Specifically, the protective switch 34 may be configured to serve, for example, as a normally-closed contact, i.e. configured to be usually in an on state unless being turned off by the protective control unit 35. Alternatively, for example, it may be so configured that the protective switch 35, while activated, controls the protective switch 34 so that the protective switch 34 is usually in an on state.

The specific locked state may be appropriately determined. Specifically, the locked state may be defined to be a complete stop of rotation of the fan 31. In addition to the complete stop of rotation of the fan 31, the locked state may be defined to be a state where the rotational frequency of the fan 31 is less than a rotational frequency threshold. The rotational frequency herein refers to the number of rotations per unit time, i.e. a rotating speed. Alternatively, for example, the locked state may be defined to be a state where a fan current, i.e. the current passed through the motor 32, is not less than a predetermined current threshold.

In the present embodiment, as an example, the locked state is defined to be a state where the rotational frequency of the fan 31 is less than a rotational frequency threshold. Specifically, the protective function of the protective control unit 35 of the fan device 20 allows the protective switch 34 to be turned off for the period Ts1 if the rotational frequency of the fan 31 decreases to less than a rotational frequency threshold, and to be turned on again after lapse of the period Ts1.

If the fan 31 locks, the protective control unit 35 is ensured to spend a first period Tj1, starting from when the locked state has occurred to when the protective operation is started following detection of the locked state. The first period Tj1 may be, for example, in the range of 0.5 seconds to 1 second.

The fan device 20 detects the rotational frequency of the fan 31 and outputs a fan rotation signal as rotation information indicating the rotational frequency. The fan rotation signal of the present embodiment is a pulse signal, with a frequency corresponding to the rotational frequency of the fan 31.

The fan rotation signal may be outputted, for example, from a rotation sensor, not shown, which detects the rotational frequency of the fan 31. It may be so configured that the protective control unit 35 or another circuit, not shown, detects the rotational frequency of the fan 31, and that a pulse signal indicating the detected rotational frequency is outputted as a fan rotation signal. The fan rotation signal being a pulse signal is not essential. The fan rotation signal may be in another form capable of outputting rotation information indicating the rotational frequency of the fan 31. For example, the fan rotation signal may be in the form of digital data indicating the rotational frequency of the fan 31.

The vehicle 1 includes a lighting unit switch 12 and an illuminance sensor 14. The lighting unit switch 12 is operated by an occupant of the vehicle 1. The occupant of the vehicle 1 can turn the lighting unit 10 on or off by operating the lighting unit switch 12. The operation signal indicating the operated state of the lighting unit switch 12 is inputted to the lighting unit control device 30. The illuminance sensor 14 detects illuminance around the vehicle 1, and outputs a signal indicating the detected illuminance. The illuminance signal outputted from the illuminance sensor 14 is inputted to the lighting unit control device 30.

The lighting unit control device 30 includes a control unit 21, a lighting unit actuator 22, and a constant voltage power circuit 23. The control unit 21 includes a microcomputer which includes a CPU 21*a*, and a memory 21*b*. The memory 21*b* may be a semiconductor memory, such as a RAM, a ROM, a flash memory, or the like. The control unit 21 has various functions which are each achieved by the CPU 21*a* executing a program stored in a non-transitory tangible recording medium. In the present example, the memory 21*b* corresponds to the non-transitory tangible recording medium that stores the program. With this program being executed, a method corresponding to the program is implemented. The control unit 21 may include a single microcomputer or may include a plurality of microcomputers.

The control unit 21 being configured to include a microcomputer is not essential. The method of the control unit 21 implementing various functions should not be limited to software processes, but the method may be partially or entirely implemented by a single hardware component or a plurality of hardware components. For example, if the functions are implemented by an electronic circuit as a hardware component, the electronic circuit may be accomplished by a digital circuit including a number of logic circuits, or an analog circuit, or a combination thereof.

(1-2) Function of the Control Unit of the Lighting Unit Control Device

The control unit 21 has at least two functions. One is a lighting unit control function exerting a control over turning-on or-off of the lighting unit 10. The other is a power supply control function exerting a control over the operation of the constant voltage power circuit 23.

The following description specifically addresses the lighting unit control function. The control unit 21 receives an operation signal from the lighting unit switch 12 and an illuminance signal from the illuminance sensor 14. If the operation signal from the lighting unit switch 12 instructs turning-on of the lighting unit 10, the control unit 21 controls the lighting unit actuator 22 based on the operation signal to cause the lighting unit actuator 22 to supply electrical power to the lighting unit 10 to thereby turn on the lighting unit 10. If the operation signal from the lighting unit switch 12 instructs turning-off of the lighting unit 10, the control unit 21 controls the lighting unit actuator 22 to cause the lighting unit actuator 22 to stop supply of electrical power to the lighting unit 10 to thereby turn off the lighting unit 10. The control unit 21 turns on the lighting unit 10 if the illuminance is lower than a given level, based on an illuminance signal from the illuminance sensor 14, even if there is an input of an operation signal from the lighting unit switch 12 instructing turning-off of the lighting unit 10.

The following description addresses the power supply control function of the control unit 21. The control unit 21 outputs a power supply control signal to the constant voltage power circuit 23 to control operation of the constant voltage power circuit 23.

The constant voltage power circuit 23 generates direct-current (DC) fan power, based on the electrical power supplied, for example, from a power source such as a battery, not shown, of the vehicle 1, and outputs the generated power to the fan device 20. For example, the fan power has a voltage of DC 5V. The constant voltage power circuit 23 may, for example, be a series regulator or a switching regulator. Generation of fan power performed by the constant voltage power circuit 23 is controlled by the power supply control signal from the control unit 21.

The constant voltage power circuit 23 corresponds to the power supply section of the present disclosure. The power supply section may have a configuration different from the constant voltage power circuit. Specifically, the power supply section may have any configuration as long as the configuration enables generation of electrical power for rotating the fan 31.

In a normal state where the lighting unit 10 does not have to be lit, the control unit 21 outputs a power supply control signal to the constant voltage power circuit 23 to instruct output stop of fan power. When instructed to stop the output of fan power by the power supply control signal, the constant voltage power circuit 23 stops the output of fan power. In this case, the constant voltage power circuit 23 may stop generation of fan power, or may stop the entire operation of the constant voltage power circuit 23 including generation of fan power, or may generate fan power but stop output of the generated fan power to the fan device 20. Alternatively, for example, the lighting control device 30 may be provided with a switch therein so as to be located on the fan power supply path extending from the constant voltage power circuit 23 to the fan device 20, and the switch may be turned off to interrupt output of fan power to the fan device 20.

While the lighting unit 10 is lit, the control unit 21 consecutively or intermittently outputs a power supply control signal to the constant voltage power circuit 23 to instruct generation of fan power. While being instructed to generate fan power by the power supply control signal, the constant voltage power circuit 23 outputs fan power to the fan device 20.

The control unit 21 receives input of a fan rotation signal outputted from the fan device 20. The control unit 21 detects the rotational frequency of the fan 31, based on the fan rotation signal, and determines whether the fan 31 is in a locked state, based on the detected rotational frequency. Then, if the fan 31 is determined to be in a locked state, the control unit 21 causes the constant voltage power circuit 23 to stop the output of fan power for a given length of time. This function is termed lock-handling function hereinafter.

If the fan 31 goes into a locked state, the control unit 21 is ensured to detect the locked state and stop the output of fan power from the constant voltage power circuit 23, before lapse of a second period Tj2 starting from when the locked state has occurred. The second period Tj2 is shorter than the first period Tj1.

Specifically, if the fan 31 goes into a locked state, the control unit 21 is ensured to stop the output of fan power from the constant voltage power circuit 23 before the fan device 20 starts protective operation, i.e. before the fan device 20 interrupts supply of fan power to the motor 32.

If the fan 31 is detected to be in a locked state and the output of fan power is stopped, the control unit 21 allows the output stop to be maintained for a predetermined period Ts2, and allows the output to start again after lapse of the predetermined period Ts2. Then, after restart of the output of fan power, the control unit 21 again monitors the rotational frequency of the fan 31, based on the fan rotation pulses. Then, if the fan 31 is determined to be in a locked state, the control unit 21 stops the output of fan power, as described above, for the predetermined period Ts2.

While the determination of the fan 31 as being in a locked state is continued, every time the locked state is detected, the number of times of the locked state, i.e. a locked-state count K, is incremented. Specifically, while the determination of the fan 31 as being in a locked state continues, the control unit 21 increments the locked-state count K by 1 every time locked state of the fan 31 is determined. Then, when the locked-state count K becomes equal to a count threshold N or more, the control unit 21 performs an abnormality confirmation process.

In the abnormality confirmation process, the output of fan power is at least stopped for a period longer than the predetermined period Ts2. Specific contents of the abnormality confirmation process may be adequately determined. For example, the state of the output of fan power being stopped may be continued until a specific measure, such as inspection, repair or change, of the fan device 20 is taken. In addition to stopping the output of fan power, for example, the occurrence of abnormality of not being able to normally operate the fan 31 may be visually or audibly notified to the occupant of the vehicle 1.

(1-3) Comparison in Operation Between Presence and Absence of the Lock-Handling Function Referring to FIGS. 2 and 3, a description will be given of an operation example of the lighting unit control device 30 and the fan device 20 when the fan 31 locks, through comparison between presence and absence of the lock-handling function in the control unit 21 of the lighting unit control device 30.

Figure 2:
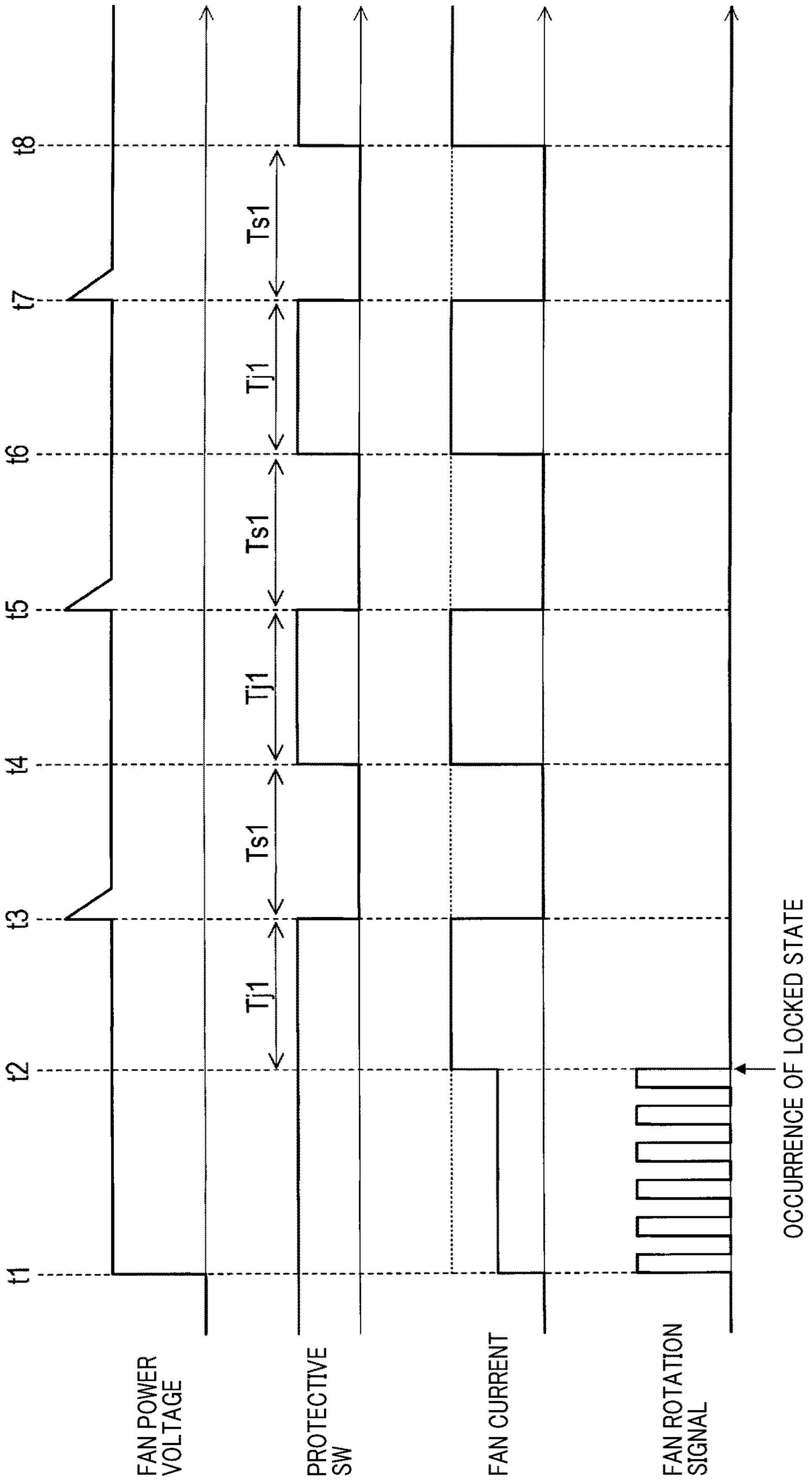
FIG. 2 is a diagram illustrating operations of a lighting unit control device and a fan device in the in the occurrence of a locked state in the case where the control unit of the lighting unit control device has no lock-handling function.

As shown in FIG. 2, in the case where the control unit 21 of the lighting unit control device 30 has no lock-handling function, if the fan 31 locks at time t2, the protective switch 34 is turned off, at time t3, by the protective function of the fan device 20 after lapse of the first period Tj1 from time t2 at which the locked state has occurred.

Upon turning-off of the protective switch 34, fan power supply to the motor 32 is interrupted, whereby fan current passed through the motor 32 becomes 0. Therefore, fan power voltage that is the voltage of fan power outputted from the constant voltage power circuit 23 overshoots. Specifically, in spite of the fan power being continuously supplied from the constant voltage power circuit 23, current supply to the motor 32 is interrupted by the fan device 20, with the result that the fan power voltage outputted from the constant voltage power circuit 23 instantaneously and abruptly increases.

At time t4 following turning-off of the protective switch 34 for the period Ts1 from time t3, the fan device 20 turns on the protective switch 34 again. Thus, fan power supply to the motor 32 is restarted.

In this case, if the fan 31 is still in the locked state, i.e. if the fan 31 has already been in a locked state when restarting supply of fan power at time t4, the fan device 20 again performs protective operation at time t5 after lapse of the first period Tj1 from the restart of fan power supply, thereby allowing the protective switch 34 to be turned off again. Accordingly, at time t5 as well, the fan power voltage overshoots, as at time t3.

Specifically, as long as the fan 31 is continuously in a locked state, the fan device 20 iterates protective operation, and every time the protective operation is performed, the fan power voltage overshoots. When the fan power voltage overshoots, an excessively high voltage may be applied to the fan device 20 to affect, or damage, the fan device 20.

In this regard, the lighting unit control device 30 of the present embodiment is provided with a lock-handling function with which the locked state of the fan 31 is detected to stop the output of fan power before the fan device 20 performs protective operation.

Figure 3:
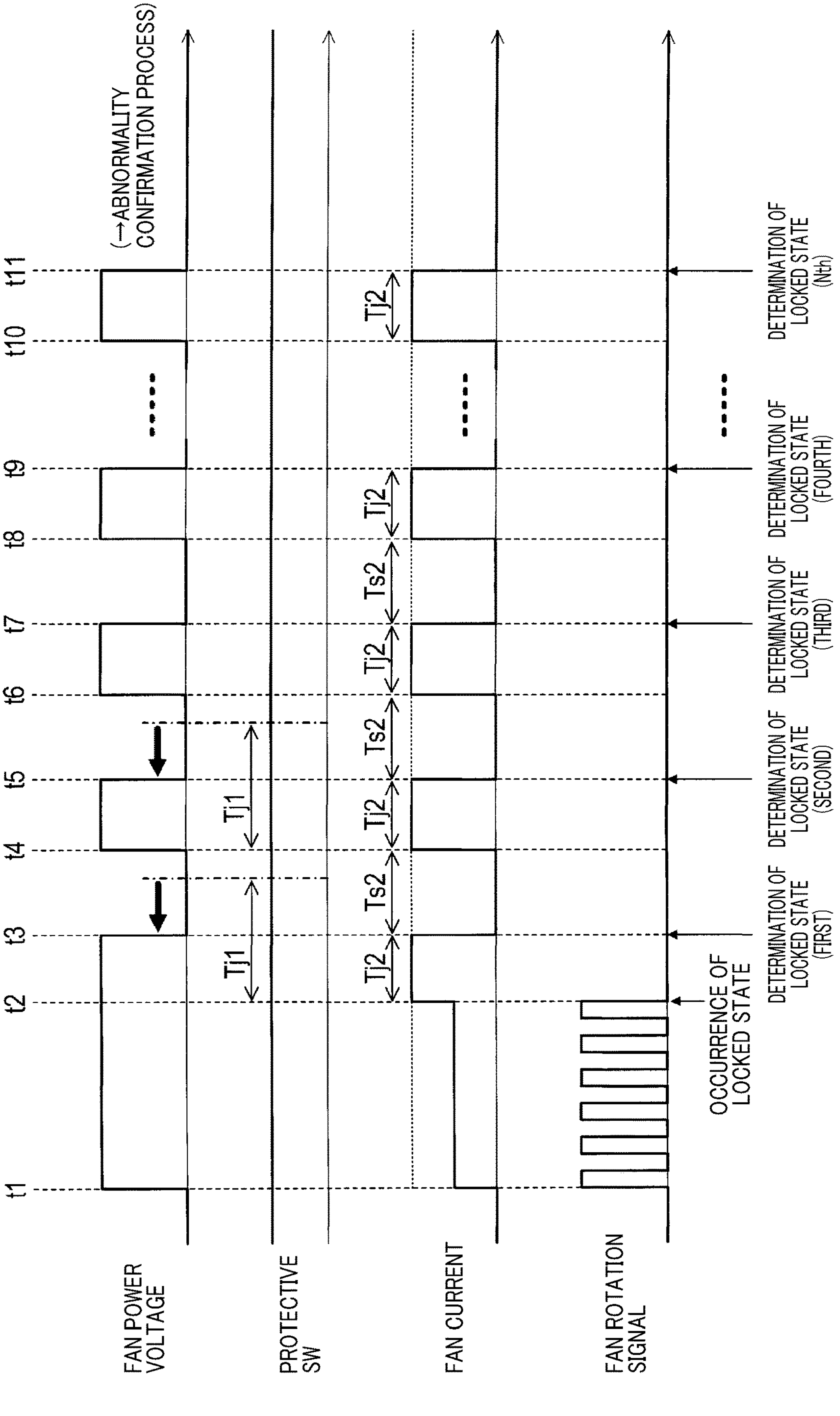
FIG. 3 is a diagram illustrating operations of a lighting unit control device and a fan device in the occurrence of a locked state in the case where the control unit of the lighting unit control device has a lock-handling function.

If the lighting unit control device 30 is imparted with the lock-handling function, when the fan 31 locks at time t2, as shown in FIG. 3, the control unit 21 determines the locked state of the fan 31 before lapse of the second period Tj2 from time t2 at which the locked state has occurred, and stops the output of fan power from the constant voltage power circuit 23. FIG. 3 shows an example in which the locked state of the fan 31 is determined at t3 after lapse of the second period Tj2 from time t2 at which the locked state has occurred, and then the output of fan power is stopped.

As mentioned above, the second period Tj2 is shorter than the first period Tj1. Therefore, after time t2 when the fan 31 has locked, the output of fan power is stopped before the fan device 20 performs protective operation.

When the output of fan power is stopped at time t3, the fan power voltage outputted from the constant voltage power circuit 23 becomes 0, and thus the fan current supplied to the fan device 20 also becomes 0. Thus, the occurrence of overshoot as shown in FIG. 2 is reduced or prevented in the fan power voltage.

The control unit 21 causes the constant voltage power circuit 23 to restart the output of fan power at time t4, following turning-off of the output of fan power for the predetermined period Ts2 from time t3. Thus, fan power is again inputted to the fan device 20.

In this case, if the fan 31 is still in a locked state, i.e. if the fan 31 has already been in a locked state when restarting the output of fan power at time t4, the control unit 21 again determines the fan 31 as being in a locked state at time t5 after lapse of the second period Tj2 from restarting the output of fan power, and the output of fan power is stopped again. In this case as well, the output of fan power is stopped before the fan device 20 performs protective operation.

As long as the fan 31 is continuously in a locked state, the control unit 21 iterates pause and resume of the output of fan power. Then, when the locked-state count K reaches the count threshold N at time t11, the abnormality confirmation process is executed.

(1-4) Fan Power Supply Control Process

Referring now to the flow diagram of FIG. 4, a description will be given of a fan power supply control process executed by the control unit 21 of the lighting control device 30.

For example, when the lighting unit 10 is turned on, the control unit 21 outputs a power supply control signal to the constant voltage power circuit 23 to instruct generation of fan power to thereby start generation and output of fan power. In this case, the control unit 21 starts the fan power supply control process shown in FIG. 4. Then, for example, when the lighting unit 10 is turned off and rotation of the fan 31 is no longer necessary, the control unit 21 outputs a power supply control signal to the constant voltage power circuit 23 to instruct stop of the output of fan power to thereby stop generation and output of fan power. In this case, the control unit 21 terminates the fan power supply control process.

Figure 4:
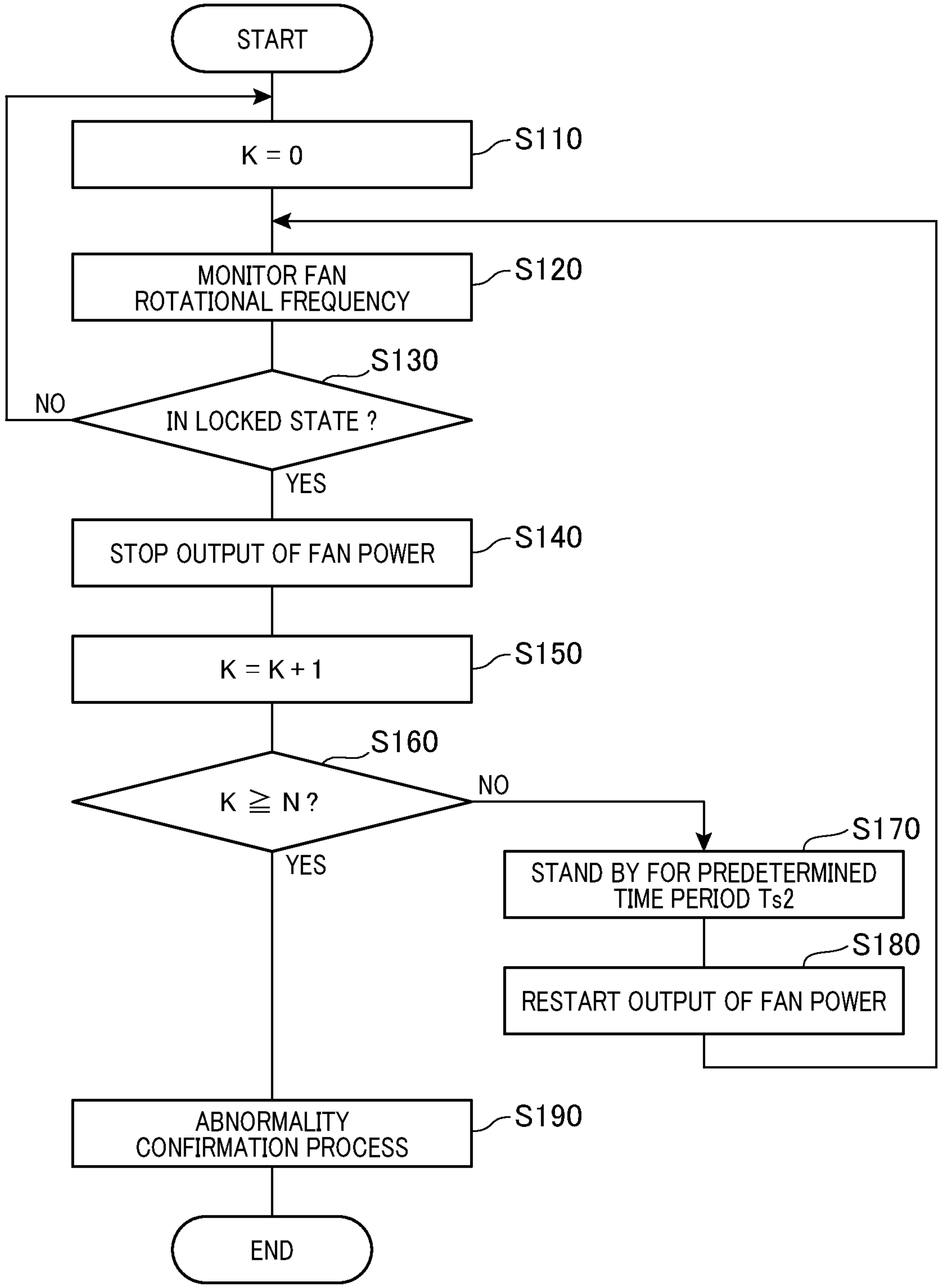
FIG. 4 is a flow diagram illustrating a fan power supply control process, according to a first embodiment.

Upon start of the fan power supply control process of FIG. 4, at S110, the control unit 21 resets the locked-state count K to 0. At S120, the control unit 21 monitors the rotational frequency of the fan 31, based on the fan rotation pulses. Specifically, the control unit 21 calculates the rotational frequency of the fan 31, based on the interval of the fan rotation pulses.

At S130, the control unit 21 determines whether the fan 31 is in a locked state, based on the rotational frequency of the fan 31 monitored at S120. If the fan 31 is not in a locked state, i.e. if the rotational frequency is not less than the rotational frequency threshold, control returns to S110. If the fan 31 is in a locked state, i.e. if the rotational frequency is less than the rotational frequency threshold, control proceeds to S140.

At S140, the control unit 21 stops the output of fan power from the constant voltage power circuit 23. In the present embodiment, if the fan 31 locks, the processing of S120 to S140 is performed within the second period Tj2.

At S150, the control unit 21 increments the locked-state count K by 1. At S160, the control unit 21 determines whether the locked-state count K is not less than the count threshold N. If the locked-state count K has not reached the count threshold N, control proceeds to S170. At S170, the control unit 21 stands by for the predetermined period Ts2, with the output of fan power being stopped. Then, after lapse of the predetermined period Ts2 from the output stop, the control unit 21 restarts, at S180, the output of fan power from the constant voltage power circuit 23, and then allows control to return to S120. After determining the fan 31 as being in a locked state, if the rotational frequency increases and the fan 31 is found to be no longer in a locked state, control proceeds from S130 to S110 to clear the locked-state count K.

At S160, if the locked-state count K is equal to the count threshold N or more, control proceeds to S190 where the abnormality confirmation process is performed.

(1-5) Advantageous Effects of the First Embodiment

The first embodiment described above yields the following advantageous effects (1a) to (1c).

(1a) If the fan 31 locks, the control unit 21 of the lighting unit control device 30 stops the output of fan power before the fan device 20 performs protective operation.

More specifically, the fan device 20 is configured to have a protective function with which at least the first period Tj1 is ensured to be spent during a period from when the fan 31 has locked until when the protective operation is started. In this regard, the control unit 21 of the lighting unit control device 30 stops the output of fan power until lapse of the second period Tj2, which is shorter than the first period Tj1, from when the fan 31 has locked.

Accordingly, the fan device 20 is prevented from performing protective operation in a state where fan power is inputted to the fan device 20. Thus, if the fan 31 locks, the occurrence of overshoot is reduced or prevented in the fan power voltage which is inputted to the fan device 20 from the constant voltage power circuit 23.

(1b) The control unit 21 of the lighting unit control device 30 monitors the rotational frequency of the fan 31, based on the fan rotation signal, and determines whether the fan 31 is in a locked state, based on the monitored rotational frequency. Therefore, the control unit 21 is able to highly accurately determine whether the fan 31 is in a locked state.

In addition, the fan device 20 is configured to output a fan rotation signal, and the control unit 21 receives an input of the fan rotation signal outputted from the fan device 20 to monitor the rotational frequency of the fan 31. Therefore, the control unit 21 is able to monitor the rotational frequency of the fan 31 without the need of separately providing a sensor, wiring, or the like for detecting the rotational frequency of the fan 31.

(1c) Every time the control unit 21 of the lighting unit control device 30 determines the fan 31 as being in a locked state, the locked-state count K is counted, i.e. the locked-state count K is incremented. Then, when the locked-state count K becomes equal to a count threshold or more, the control unit 21 performs an abnormality confirmation process. Therefore, in the occurrence of abnormality where the locked state of the fan 31 continues, the vehicle 1 can be appropriately protected from the abnormality.

The locked state herein corresponds to the first locked state or the second locked state of the present disclosure. The rotational frequency threshold corresponds to the first threshold or the second threshold of the present disclosure. The control unit 21 corresponds to the lighting unit control section or the power supply control section. The constant voltage power circuit 23 corresponds to the power supply section of the present disclosure. In the power supply control process of FIG. 4, S120 corresponds to the rotation information acquisition section of the present disclosure. S130 to S140, and S170 to S180 correspond to the output interruption section of the present disclosure. S150 corresponds to the processing performed by the count section of the present disclosure. S190 corresponds to the processing of the abnormality confirmation section of the present disclosure.

2. Second Embodiment

Since the second embodiment has a basic configuration similar to that of the first embodiment, the following description is focused on the difference. The components similar to those of the first embodiment are given the same reference signs. For these components, previous description should be referred to.

The difference of the second embodiment from the first embodiment lies in the criterion for determining locked state in relation to the fan device 20 and the criterion for determining locked state in relation to the control unit 21 of the lighting unit control device 30, and in the contents of the fan power supply control process executed by the control unit 21 of the lighting unit control device 30.

The fan device 20 performs protective operation if the fan 31 is in a first locked state where the rotational frequency thereof is less than a first rotational frequency threshold. In this regard, the control unit 21 of the lighting unit control device 30 stops the output of fan power if the fan 31 is in a second locked state where the rotational frequency thereof is less than a second rotational frequency threshold which is a predetermined rotational frequency higher than the first rotational frequency threshold.

Specifically, if the rotational frequency of the fan 31 is decreasing from the rotational frequency of a normal state, the second locked state occurs earlier than the first locked state. Thus, the control unit 21 stops the output of fan power if the fan 31 is determined to be in the second locked state which is a state before the fan 31 locks, i.e. a state where the rotational frequency has not yet lowered to the degree for the fan device 20 to perform protective operation.

Therefore, the second period Tj2 required for the control unit 21 to determine the second locked state may be longer than the second period Tj2 of the first embodiment.

Figure 5:
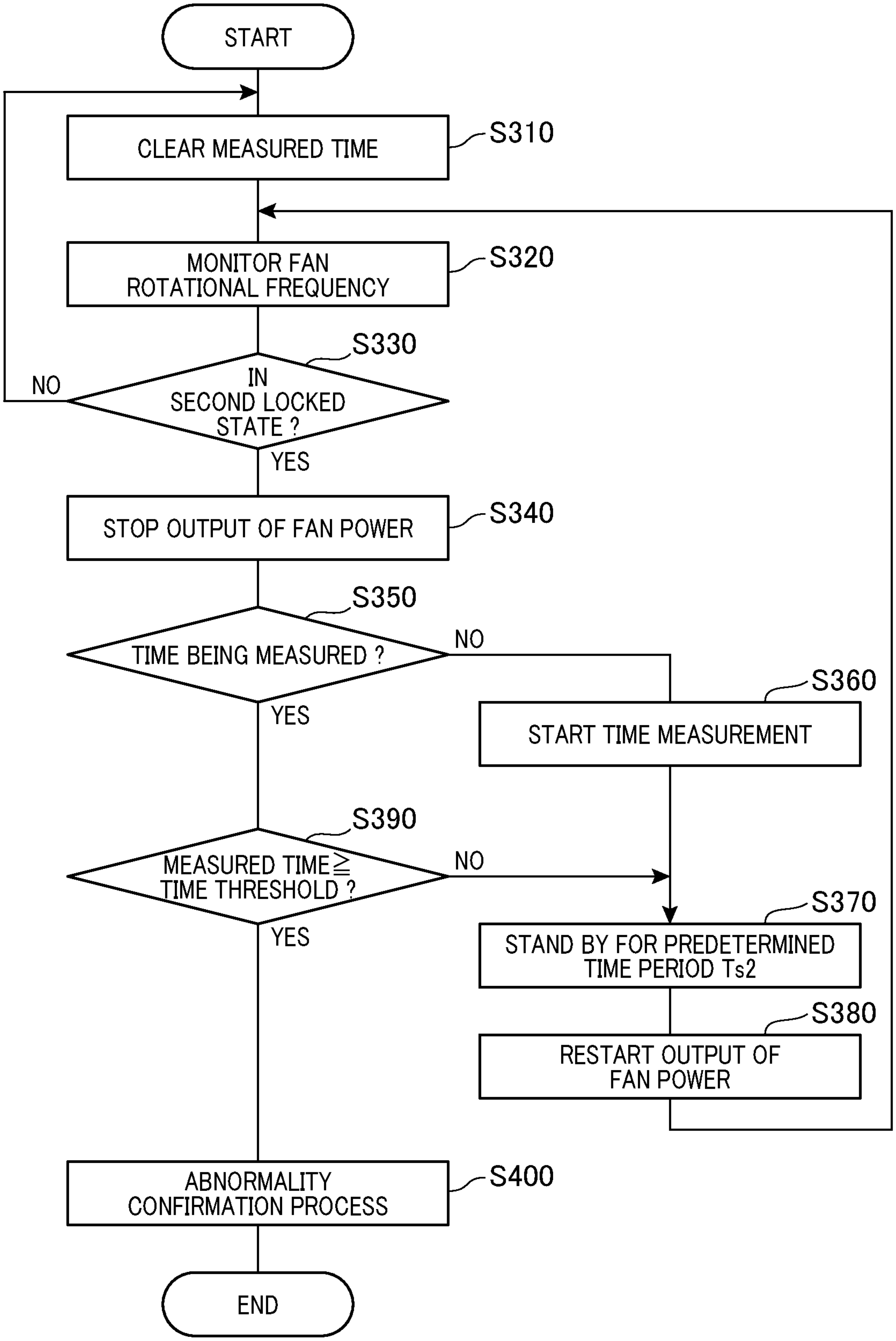
FIG. 5 is a flow diagram illustrating a fan power supply control process, according to a second embodiment.

Referring now to FIG. 5, a fan power supply control process of the second embodiment will be described. Upon start of the fan power supply control process of FIG. 5, at S310, the control unit 21 clears measured time to 0. The measured time herein refers to time elapsed from the second locked state, if determined to have occurred, in the fan 31.

At S320, the control unit 21 monitors the rotational frequency of the fan 31, as at S120 of FIG. 4. At S330, the control unit 21 determines whether the fan 31 is in the second locked state, based on the rotational frequency of the fan 31 monitored at S320. If the fan 31 is not in the second locked state, i.e. if the rotational frequency is not less than the second rotational frequency threshold, control returns to S310. If the fan 31 is in the second locked state, i.e. if the rotational frequency is less than the second rotational frequency threshold, control proceeds to S340. At S340, the control unit 21 stops the output of fan power from the constant voltage power circuit 23. In the second embodiment, if the fan 31 is in the second locked state, the processing of S320 to S340 is performed within the second period Tj2.

At S350, it is determined whether measurement of elapsed time is already been executed. If not yet executed, the control unit 21 allows, at S360, measurement of the elapsed time to start. At S370, the control unit 21 stands by for the predetermined period Ts2, with the output of fan power being stopped. Then, after lapse of the predetermined period Ts2 from the output stop, the control unit 21 causes, at S380, the constant voltage power circuit 23 to restart the output of fan power, and then allows control to return to S320.

At S350, it is determined whether measurement of elapsed time is already been executed. At S390, it is determined whether the measured time is not less than a time threshold. The time threshold may be appropriately determined. In the second embodiment, for example, the time threshold is set to a predetermined value within the range of 4 seconds to 120 seconds. If the rotational frequency increases during measurement and the fan 31 is no longer in the second locked state, control proceeds from S330 to S310 where the measured time is cleared.

At S390, if the measured time is less than the time threshold, control proceeds to S370. If the measured time is not less than the time threshold, control proceeds to S400 where an abnormality confirmation process is performed.

The second embodiment specifically described above yields the advantageous effects (1b) of the first embodiment mentioned above. Furthermore, the advantageous effect (1a) of the first embodiment can be enhanced. Specifically, in the second embodiment, the criterion for determining the locked state of the fan 31 is different between the fan device 20 and the lighting unit control device 30. The criterion is more severe in the lighting unit control device 30 than in the fan device 20. Therefore, if the rotational frequency of the fan 31 is decreasing, the output of fan power is stopped earlier than the fan device 20 performing protective operation.

In the second embodiment, the abnormality confirmation process is performed if the second locked state continues for not less than a period corresponding to the time threshold. Therefore, in the occurrence of abnormality where the second locked state continues, the vehicle 1 can be appropriately protected from the abnormality.

In the fan power supply control process of FIG. 5, S320 corresponds to the rotation information acquisition section of the present disclosure. S330 to S340, and S370 to S380 correspond to the output interruption section of the present disclosure. S350 to S360 correspond to the processing of the time measurement section of the present disclosure. S400 corresponds to the processing of the abnormality confirmation section of the present disclosure.

3. Other Embodiments

Some embodiments of the present disclosure have been described so far, but the present disclosure should not be limited to the embodiments described above and can be implemented in various modes.

(3-1) It is not essential to use the rotational frequency of the fan 31 as a basis for determining whether the fan 31 is in a locked state. The locked state may be determined based on other physical quantities indicating the rotational frequency of the fan 31.

For example, the locked state of the fan 31 may be determined based on the fan current passed through the motor 32 of the fan device 20. Specifically, a current threshold may be set for the fan current so that the locked state of the fan 31 can be determined when the fan current has increased to not less than the current threshold.

In this case, the current threshold of the fan device 20 may be set as a first current threshold, and the current threshold of the control unit 21 of the lighting unit control device 30 may be set as a second current threshold, which is smaller than the first current threshold, so that the locked state can be determined when the fan current in the lighting unit control device 30 has increased to not less than the second current threshold.

If the fan current is used as a basis for determining the locked state of the fan 31, the locked state may be determined immediately after the fan current has become not less than the current threshold, or may be determined when the fan current continues to be not less than the current threshold for a predetermined period of time.

If fan current is used as a basis for determining the locked state of the fan 31, the information indicating fan current may be ensured to be outputted from the fan device 20 and inputted to the lighting unit control device 30. Alternatively, a current detection circuit for detecting fan current may be separately provided so that the information of the fan current is ensured to be acquired from the current detection circuit.

(3-2) In the first embodiment, it is not essential to perform the abnormality confirmation process when the locked-state count K has become equal to the count threshold N or more. The abnormality confirmation process may be performed immediately after determination of a locked state.

(3-3) In the lighting unit control device 30, the lighting unit 10 and the constant voltage power circuit 23 may be controlled using the respective microcomputers.

(3-4) In the lighting unit control device 30, part or all of the locked-state determination based on the rotation information of the fan 31, as well as the control of the constant voltage power circuit 23 based on this determination, may be implemented by hardware processing, instead of the software processing of a microcomputer.

(3-5) The fan device 20 shown in FIG. 1 is only an example of the configuration of a fan device. The present disclosure is applicable to various types of fan devices in which the fan is ensured to be rotated by supplied fan power.

(3-6) A plurality of functions of a single component of the embodiments described above may be implemented by a plurality of components, or one function of a single component may be implemented by a plurality of components. Alternatively, a plurality of functions of a plurality of components may be implemented by a single component, or one function implemented by a plurality of components may be implemented by a single component. Furthermore, part of the configurations of the embodiments described above may be omitted. Furthermore, at least part of the configuration of an embodiment described above may be added to or replaced by another configuration of the embodiment described above. All the modes included in the technical idea as defined by the language of the claims should be the embodiments of the present disclosure.

(3-7) Besides the lighting unit control device 30 described above, the present disclosure may be implemented in various modes, including a system using the lighting unit control device 30 as a component, a program for causing a computer to function as the lighting unit control device 30, a non-transitory tangible recording medium, such as a semiconductor memory, recording this program, or a method of controlling the output of fan power in the lighting unit control device 30.

The invention claimed is:

1. A vehicle lighting unit control device installed in a vehicle, wherein:
the vehicle comprises
a lighting unit, and
a fan device configured to cool the lighting unit;
the fan device comprises
a fan, and
a motor configured to rotate the fan;
the fan device is so configured that the motor is rotated by electrical power supplied from the vehicle lighting unit control device, and that protective operation is performed to reduce or interrupt an input of the electrical power to the motor in response to the fan going into a first locked state;
the vehicle lighting unit control device comprises
a lighting unit control section configured to control the lighting unit,
a power supply section configured to generate and output the electrical power to the fan device, and
a power supply control section configured to control output of the electrical power to the fan device from the power supply section;
the power supply control section comprises
a rotation information acquisition section configured to acquire rotation information indicating rotational frequency of the fan, and
an output interruption section configured to determine whether the fan is in a second locked state, based on the rotation information acquired by the rotation information acquisition section, and interrupt output of the electrical power to the fan device from the power supply section in response to the fan being in the second locked state;
the second locked state is set to be the same as the first locked state, or set to occur earlier than the first locked state in response to the rotational frequency of the fan decreasing; and
the output interruption section is configured to interrupt output of the electrical power before the fan device performs the protective operation, in response to the second locked state having occurred, wherein
in response to the fan going into the first locked state, the fan device is ensured to perform the protective operation after lapse of at least a first required period from the occurrence of the first locked state; and
the output interruption section is configured to interrupt output of the electrical power before lapse of a second required period, which is shorter than the first required period, from actual occurrence of the second locked state.

2. The vehicle lighting unit control device according to claim 1, wherein:
the first locked state is a state where a specific physical quantity corresponding to the rotational frequency is a smaller one of a value that is not less than a specific first threshold and a value that is less than the specific first threshold; and
the second locked state is a state that is the same as the first locked state, or is a state where the physical quantity corresponding to the rotational frequency is a smaller one of a value that is not less than a specific second threshold and a value that is less than the specific second threshold, the specific second threshold being larger than the specific first threshold.

3. The vehicle lighting unit control device according to claim 2, wherein
the physical quantity is the rotational frequency.

4. The vehicle lighting unit control device according to claim 1, wherein
the second locked state is the same as the first locked state.

5. A vehicle lighting unit control device installed in a vehicle, wherein:
the vehicle comprises
a lighting unit, and
a fan device configured to cool the lighting unit;
the fan device comprises
a fan, and
a motor configured to rotate the fan;
the fan device is so configured that the motor is rotated by electrical power supplied from the vehicle lighting unit control device, and that protective operation is performed to reduce or interrupt an input of the electrical power to the motor in response to the fan going into a first locked state;
the vehicle lighting unit control device comprises
a lighting unit control section configured to control the lighting unit,
a power supply section configured to generate and output the electrical power to the fan device, and
a power supply control section configured to control output of the electrical power to the fan device from the power supply section;
the power supply control section comprises
a rotation information acquisition section configured to acquire rotation information indicating rotational frequency of the fan, and
an output interruption section configured to determine whether the fan is in a second locked state, based on the rotation information acquired by the rotation information acquisition section, and interrupt output of the electrical power to the fan device from the power supply section in response to the fan being in the second locked state;
the second locked state is set to be the same as the first locked state or set to occur earlier than the first locked state in response to the rotational frequency of the fan decreasing; and
the output interruption section is configured to interrupt output of the electrical power before the fan device performs the protective operation, in response to the second locked state having occurred, wherein:
the output interruption section is configured to interrupt output of the electrical power for a given length of time, in response to the fan being determined to be in the second locked state, and then restart output of the electrical power to the fan device; and
the output interruption section further comprises
a count section configured to count a number of times of determining the fan as being in the second locked state, and
an abnormality confirmation section configured to perform an abnormality confirmation process, including at least interrupting output of the electrical power for a period longer than the given length of time, in response to the number of times counted by the count section becoming equal to a count threshold or more.

6. A vehicle lighting unit control device installed in a vehicle, wherein:

the vehicle comprises
a lighting unit, and
a fan device configured to cool the lighting unit;
the fan device comprises
a fan, and
a motor configured to rotate the fan;
the fan device is so configured that the motor is rotated by electrical power supplied from the vehicle lighting unit control device, and that protective operation is performed to reduce or interrupt an input of the electrical power to the motor in response to the fan going into a first locked state;
the vehicle lighting unit control device comprises
a lighting unit control section configured to control the lighting unit,
a power supply section configured to generate and output the electrical power to the fan device, and
a power supply control section configured to control output of the electrical power to the fan device from the power supply section;
the power supply control section comprises
a rotation information acquisition section configured to acquire rotation information indicating rotational frequency of the fan, and
an output interruption section configured to determine whether the fan is in a second locked state, based on the rotation information acquired by the rotation information acquisition section, and interrupt output of the electrical power to the fan device from the power supply section in response to the fan being in the second locked state;
the second locked state is set to be the same as the first locked state, or set to occur earlier than the first locked state in response to the rotational frequency of the fan decreasing; and
the output interruption section is configured to interrupt output of the electrical power before the fan device performs the protective operation, in response to the second locked state having occurred, wherein:
the output interruption section is configured to interrupt output of the electrical power for a given length of time and then restart output of the electrical power to the fan device, in response to the fan being determined to be in the second locked state; and
the output interruption section further comprises
a time measurement section configured to measure an elapsed time from when the fan is determined to be in the second locked state, in response to the second locked state occurring, and
an abnormality confirmation section configured to perform an abnormality confirmation process, including at least interrupting output of the electrical power for a period longer than the given length of time, in response to the elapsed time measured by the time measurement section becoming equal to a time threshold or more, without the fan being determined not to be in the second locked state, after starting of the measurement performed by the time measurement section.

7. The vehicle lighting unit control device according to claim 1, wherein:
the fan device is configured to output the rotation information; and
the rotation information acquisition section is configured to acquire the rotation information outputted from the fan device.

* * * * *